Feb. 5, 1946.  J. W. SEAMANS  2,394,265

STEEL AND OTHER SHEET METALS WELDER'S HOIST

Filed March 8, 1944

INVENTOR.
JAMES W. SEAMANS
BY Edward Healy
ATTORNEY

Patented Feb. 5, 1946

2,394,265

UNITED STATES PATENT OFFICE 2,394,265

STEEL AND OTHER SHEET METALS WELDER'S HOIST

James W. Seamans, San Leandro, Calif.

Application March 8, 1944, Serial No. 525,608

1 Claim. (Cl. 113—99)

This invention relates to an improved sheet metal welder's hoist and particularly relates to an improved device for facilitating the work of the welder in holding and aligning the metal sheets during the welding process.

In the construction of various types of tanks, ships, aeroplanes and the like, large sheets of metal are employed and are welded together to form the sides and different compartments. The sheets must be aligned with their edges in proximity and held in the proper position until the welding thereof is sufficiently complete to unite them. The holding and aligning of the sheets by the hands is a very difficult task, due to their size and weight. Furthermore, the sheets sometimes become considerably hot on account of the heat produced by the welding process.

It is therefore an object of the present invention to provide an improved vacuum-producing metal member that will not be affected by the heat and which is capable of being engaged to and holding the metal sheet and to pivotally connect said vacuum member to a fulcrum lever whereby the sheets can be lifted and moved laterally and longitudinally and aligned in an efficient manner.

Another object of the invention is to preferably form the device out of an especially constructed cylinder and piston and to provide means on the bottom edge of the cylinder that is capable of producing a tight seal on the surface of the metal sheet for maintaining the vacuum in the cylinder.

And a further object of the invention is to construct the device in a manner that will enable it to be quickly adjusted to accommodate different working conditions.

Other objects and features of advantage will be apparent during the course of the following description:

In the accompanying drawing forming a part of the specification and in which like numerals are employed to designate like parts throughout the same:

Figure 1:
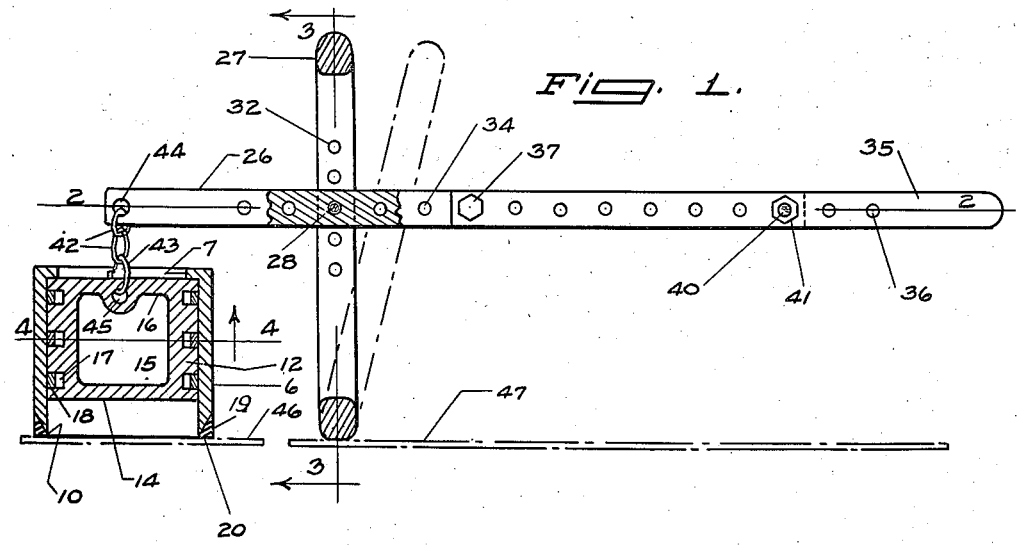
Fig. 1 is a central vertical longitudinal partial sectional view of the improved device embodying the invention.
Figure 2:
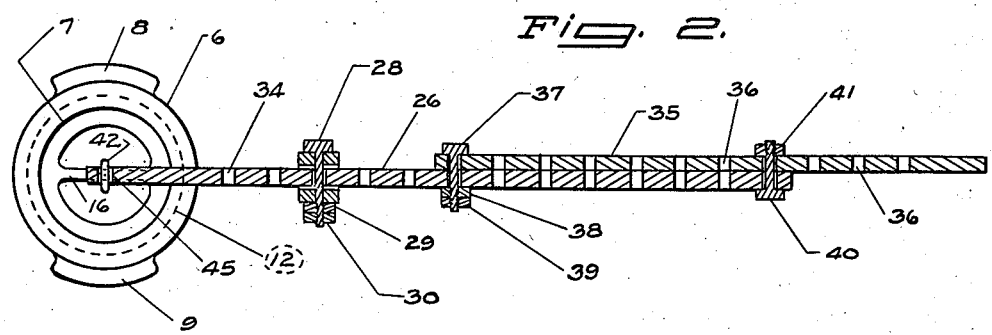
Fig. 2 is a sectional plan view of the device taken on line 2—2 of Fig. 1.

Referring in detail to the drawing and to the different parts thereof the numeral 6 designates a cylinder preferably formed with an inner annular flange 7, a pair of overhanging flanges 8 and 9 and a sharp bottom edge 10 as shown in Fig. 1. The numeral 12 designates a suitable piston formed with a flat bottom surface 14, a hollow portion 15 and a cross bar 16, as shown in Figs. 1 and 2. The outer diameter of said piston is slightly less than the inner diameter of the cylinder and a series of circumferential grooves 17 are provided in the wall of the piston for carrying a plurality of conventional piston rings 18 whereby a sliding air tight seal within the cylinder is produced. An inner beveled packing ring 19, having a flat bottom surface 20 and made of any suitable material, is positioned onto the lower outer portion of the cylinder and is substantially cemented thereon or otherwise fixed thereto in any suitable manner. The sharp bottom edge 10 of the cylinder and the flat resilient bottom surface 20 of the ring 19 enables the cylinder to have an air tight fit upon the flat surface of a piece of sheet metal or the like. By tapping the top of the cylinder with a hammer or the like the sharp bottom edge 10 of the cylinder will become imbedded into any rough surface on the face of the sheet metal thus providing an air tight seal for enabling a perfect vacuum to be produced and maintained.

Figure 5:
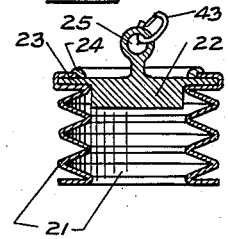
Fig. 5 is a vertical sectional view of a modified form of a vacuum producing device used in the invention.

In Fig. 5 there is illustrated a modified view of an especially constructed all metal vacuum cup 21 that can be employed in the invention. The said vacuum cup is made of an exceptionally thin metal known in the trade as sulpham flexible corrugated metal. Thin copper metal, such as employed in the construction of conventional flexible metal vacuum bellows now on the market, can also be used. The flexible metal vacuum cup is preferably formed as illustrated in Fig. 5 and is provided with a piston member 22, having a flanged top portion 23 that is preferably fixed to the top portion of the cup 21 by being welded thereto as indicated at 24. The piston member 22 is formed with an I-bar 25 to provide means for enabling the same to be secured to a suitable lever or other lifting device.

In Figs. 1 and 2 there is illustrated the preferred type of lifting device employed in the invention and comprises a lever 26 that is pivotally secured to an upright 27 by means of a bolt 28 and a pair of lock nuts 29 and 30 respectively.

Figure 3:
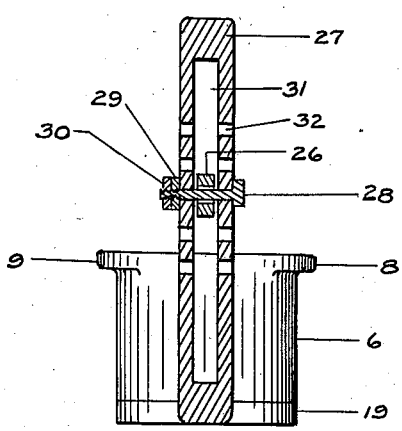
Fig. 3 is a vertical sectional view of the device taken on line 3—3 of Fig. 1, looking in direction of the arrows.
Figure 4:
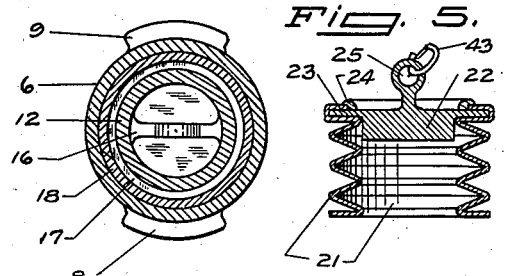
Fig. 4 is a horizontal sectional view taken through the cylinder and piston on line 4—4 of Fig. 1, looking in direction of the arrow.

The said upright is slotted as at 31 and the lever 26 is positioned therein as shown in Fig. 3. A series of holes 32 are provided through the upright and likewise a series of holes 34 are provided through the lever 26 for enabling the two members to be adjustably connected together in different positions. A second lever bar 35, having a series of holes 36, is provided and is adjustably connected to the first lever 26 by a bolt 37 and a pair of lock nuts 38 and 39. A second bolt and nut 40 and 41 respectively can be used to secure the two levers together, if desired. The holes in both levers are spaced equally apart. The said levers can thus be lengthened and also adjusted at different angles with respect to each other. The lever 26 is preferably connected to the piston through the medium of a chain having a plurality of links 42 and a conventional snaphook 43, the holes 44 and 45 in the lever and piston respectively, enabling the chain to connect the members together as illustrated in Fig. 1. The said lever can also be connected to the I-bar 25 of the piston 22, illustrated in Fig. 5, in exactly the same manner as hereinbefore described.

The numerals 46 and 47 designate two fragmentary portions of sheet metal laid adjacent each other prior to their being aligned together to be welded. When it is desired to align the sheets, the upright 27 is placed onto one of the sheets and the cylinder placed onto the other sheet, as illustrated in Fig. 1. By lifting the lever upwardly the piston is caused to move downwardly, forcing the air out of the cylinder, and by holding the cylinder tightly against the surface of the sheet metal and moving the lever downwardly will cause the piston to move upward, whereby a vacuum is produced in the cylinder that will hold the sheet of metal thereto. A continued downward movement of the lever will raise the cylinder and sheet of metal 46. By then moving the upright in the direction as shown in dot and dash outline in Fig. 1 will bring the sheet 46 against the sheet 47, where they can be held in an aligned position to be welded.

The device shown in Fig. 5 can be substituted for the cylinder and piston shown in Fig. 1, the principles involved being the equivalent of each other, the primary object of the invention being to provide an improved vacuum-producing metal member that will not be affected by heat and combining the same with an improved lifting device whereby the handling of the sheet metal is facilitated.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A sheet metal welder's hoist embodying in its construction an upright, a lever pivotally connected thereto, means carried by said lever and said upright for adjustably securing the same one to the other, a piston pivotally connected to one end of said lever, said connecting means comprising a chain element, a cylinder for receiving said piston whereby a vacuum is produced to hold said cylinder to the sheet metal, said cylinder having a sharp edge around the bottom end to effect a tight seal on the sheet metal to maintain the vacuum in the cylinder.

JAMES W. SEAMANS.